United States Patent Office 3,257,334
Patented June 21, 1966

---

3,257,334
ELECTRODIALYSIS MEMBRANE FROM PER-HALOGENATED FLUOROCARBONS
William Kwo-Wei Chen, Stamford, and Howard Martin Halter, South Norwalk, Conn., Eric Bell Hotelling, Portsmouth, Va., and Clayton Andrew Wetmore, Norwalk, Conn., assignors to American Machine & Foundry Company, a corporation of New Jersey
No Drawing. Continuation of application Ser. No. 790,824, Feb. 3, 1959. This application Jan. 21, 1963, Ser. No. 252,576
5 Claims. (Cl. 260—2.1)

This application is a continuation of our copending application Serial No. 790,824, filed February 3, 1959, and now abandoned.

This invention relates to electrodialysis membranes and to compositions of matter made with fluoropolymers and characterized by thermal stability and high resistance to chemical degradation and to methods of making the same. More particularly, this invention relates to compositions of matter and articles of manufacture such as electrodialysis membranes comprising in combination a fluoropolymer and a polymer derived from a vinyl monomer. This invention also relates to the use and manufacture of these materials and articles in ion exchange and dialysis applications and particularly as electrodialysis membranes.

Various combinations of polymers have been made with ethylenically unsaturated monomers to form copolymers, polymer alloys and related compositions, but most of these systems have been readily degraded by severe conditions of chemical attack and high temperature. Heretofore, it has been difficult except by ionizing radiation to form homogeneous compositions combining the inertness of fluoropolymers with the active or reactive properties of polymerized vinyl monomers.

Accordingly, it is an object of this invention to provide a composition of matter characterized by high resistance to chemical degradation.

It is also an object of this invention to provide a fluoropolymer composition characterized by high resistance to thermal degradation.

It is an object of this invention to provide articles of manufacture in the form of electrodialysis membranes, tubes, filaments, fabrics and beads for use in ion exchange, oxidation-reduction systems and separation of materials, said articles being formed from fluoropolymer combinations of this invention.

Furthermore, it is an object of this invention to provide methods of making the above compositions of matter and articles of manufacture.

The fluoropolymer compositions of this invention are prepared from at least a two-component system. The first component is a fluoropolymer which may be derived from one or more monomer systems. Therefore, the first component may be a polymer, copolymer or terpolymer, for example. The first component is preferably a long chain carbon compound, either straight or branched, substituted with fluorine atoms in at least half the sites available for substitution. The chain is further substituted with hydrogen or halogen atoms in the remaining sites available for substitution. Such long chain carbon compounds are characterized by the following general formula:

in which Z represents hydrogen or a halogen atom and $n$ is an integer greater than unity.

Among such long chain carbon compounds which may be employed as the first component of this composition of matter are: poly(tetrafluoroethylene), poly(chlorotrifluoroethylene), poly(perfluoropropylene), poly(vinylidene fluoride), poly(1,1-difluoro-2,2-dichloroethylene), and copolymers of these materials with one another or with other materials having the general formula shown above.

The second component of the fluoropolymer combinations and compositions of this invention is ethylenically unsaturated and derived from the polymerization or copolymerization of a vinyl type monomer. Vinyl monomers useful in the production of the second component of the composition of this invention may be selected from the class consisting of:

(a) Aralkenes such as styrene, vinyl toluene, indene, divinylbenzene, vinyl pyridines, vinyl picolines, vinyl collidines, and other related compounds.

(b) Allylically unsaturated aliphatic amines, for example, allylamine, diallylamine, triallylamine, allyl propylamine, methyl diallylamine and related materials.

(c) Ethylenically unsaturated sulfonic acids and their derivatives such as vinyl sulfonic acid, styrene sulfonic acid, and the salts, esters and amides of these materials.

(d) Ethylenically unsaturated carboxylic acids and their derivatives such as maleic acid, fumaric acid, vinyl benzoic acid, itaconic acid, acrylic acid, methacrylic acid, N,N-dialkyl amino alkyl methacrylic acids, and related salts, esters, amides, nitriles and anhydrides.

(e) Mixtures of all of the above materials which can be combined to form copolymers.

Only those monomers and monomer mixtures which will polymerize or copolymerize at a reasonable rate will produce a commercially valuable product.

These materials may be prepared by several different methods. The fluoropolymer component may be in the form of film, powder, aqueous emulsion or coagulated emulsion. The monomer precursor of the second component, with or without solvents or dispersing agents, may be added to the first component under suitable conditions such as with appropriate apparatus, pressure and temperature, and the mixture then treated to bring about combination by a variety of different possible treatments. These treatments include chemical initiation, such as by peroxides or persulphates, with or without the assistance of a redox system, or by heat, for example. It is a feature of this invention that treatment may be effected in atmospheric conditions without the use of a vacuum.

All of these methods can be used when the fluoropolymer component of the composition and monomer precursor are in contact with one another.

The combination resulting from the interaction of the first polymer component and the monomer may have various forms, depending upon the exact method of preparation and the chemical nature of the starting materials. Commonly, the product is a block polymer, in which the first component and the second component form alternating units of varying length in a chain. However, in some cases the monomer second component is grafted onto the first component to form side chains of varying size attached to the main stem or trunk of the first component. In some cases, the second component forms a cyclised polymer or cross-linked network around and about the fluoropolymer first component. In other cases the monomer polymerizes to form the second component which is in some cases in the form of a linear homopolymer interlacing the first component without recognizable chemical bonds, but forming an intimate and inseparable plastic alloy. In general, the compositions according to this invention comprise an intimate molecular combination of two or more polymer systems which are not leached apart in any appreciable degree when treated with solvents.

The product of this invention, the fluoropolymer combination, resulting from any of the processes described above may be separated at least to some degree from unreacted monomer, homopolymer, solvent and dispersing agent by appropriate methods such as filtration, centrifuging, washing or evaporation. Some of the homopolymer formed from the monomer is naturally intimately associated and interlaced with the fluoropolymer and is not separated by this treatment. Small amounts of other related materials such as unreacted monomer and dispersing agent may also be associated with this composition of matter.

If the product of this invention is in the form of a film at the time it is separated from the monomer bath or reaction mixture, it may be ground into a powder. If the reaction product is in the form of a powder or coagulated mass or curd, it may be worked at suitable temperatures into a film by molding, shaving, casting or calendering and extruding. Either the film form or the powder may be further processed to yield chemical derivatives thereof.

However, the compositions according to this invention ing and extruding. Either the film form or hte powder which must resist oxidizing atmospheres or strong chemicals or both. They are also useful as gaskets in various corrosive plumbing situations.

The compositions according to this invention are also useful as ion exchange materials and particularly as membranes in electrodialysis apparatus. Those compositions which have inherent acidic or basic groups may have ion exchange or chelating or selective absorption properties per se. Ion exchange materials made from the fluoropolymer compositions of this invention are a feature of this invention. Methods of making these ion exchange materials are also a feature of this invention. Methods of ion exchange by using ion exchange materials made from the fluoropolymer compositions of this invention are still another feature of the invention.

This invention includes new types of ion exchange material characterized by extreme resistance to chemical degradation, high exchange capacity and excellent mechanical and electrochemical properties when formed into membranes.

The conversion of the fluoropolymer compositions of this invention into ion exchange material may be carried out by several different methods. The method to be used in any particular case will be controlled by the chemical structure of the fluoropolymer composition, the physical form of the starting material, and the type of ion exchange product or type of ion exchange groups desired in the product, such as weakly acidic groups, strongly acidic, weakly basic or strongly basic groups.

Chemically, the fluoropolymer compositions may include the following classes of reactive groups:

(a) Aromatic nuclei but no acidic or basic groups.

(b) Primary (secondary or tertiary amines which may be aliphatic, aromatic or heterocyclic.

(c) Aliphatic or aromatic sulfonic acids or their derivatives such as salts, esters or amides.

(d) Aliphatic or aromatic carboxylic acids or their derivatives such as salts, esters, amides, nitriles or anhydrides.

The fluoropolymer compositions belonging to group (a) may be converted to either acidic or basic ion exchange material. Addition of acidic groups may be accomplished by reaction with chlorosulfonic acid, sulfur trioxide or fuming sulfuric acid, either at ambient or elevated temperatures. Chlorosulfonic acid is a very satisfactory material in the majority of cases. A reaction period of about two to four hours at room temperature or about thirty to sixty minutes at 70° C. produces excellent results with either pure chlorosulfonic acid or a solution of the acid in a chlorinated solvent such as ethylene dichloride. The chlorosulfonated film or polymer may then be treated with water, followed by aqueous alkali and then dilute acid to obtain material with sulfonic acid groups substituted on the aromatic rings.

The fluoropolymer compositions belonging to group (a) may also be converted into basic ion exchange material, for example, by halomethylation, such as chloromethylation, followed by a treatment with ammonia or an amine. Chloromethyl groups are substituted on the aromatic nuclei by reaction of the fluoropolymer composition in the form of film or powder, with formaldehyde and hydrogen chloride or with chloromethyl methyl ether at slightly elevated temperatures, such as 30° to 60° C., for periods of about ten minutes to about five hours. A Lewis acid catalyst may be used. The chloromethylated fluoropolymer composition is exposed to liquid or gaseous ammonia or to a primary, secondary or tertiary amine at ambient temperature for about one to ten hours at about atmospheric pressure or higher. Tertiary amines react to form quaternary ammonium salts, which are converted into strongly basic ion exchange material by interaction with a base. Ammonia and primary and secondary amines react to form weakly basic ion exchange material. This material may be further reacted, if desired, with alkyl halides or sulfates such as methyl chloride, dimethyl sulfate, dialkyl sulfates, methyl bromide, methyl iodide, ethyl or propyl halides, to induce quaternarization leading to salts of the strongly basic type of ion exchange material.

The amine containing fluoropolymer combinations of group (b) are likewise usable as weakly basic ion exchange material without further treatment. If it is desired to convert them into strongly basic ion exchange material they may be quaternized by reaction with liquid or gaseous alkyl halides or sulfates in a manner which will be obvious to those skilled in the art. Further cross linking of the ion exchange material may be produced at this point by substitutiton of alkylene or aralkylene dihalides or disulfates (e.g. pentamethylene dibromide or p-xylylene dichloride) for all or part of the alkyl halides or sulfates.

The fluoropolymer combinations of group (c) are strongly acidic ion exchange material per se if sulfonic acid groups are present. The salts, esters, or amides of these acids are converted into the acids by known chemical methods of neutralization, saponification or hydrolysis to form strongly acidic ion exchange material from fluoropolymer combinations containing these groups.

The fluoropolymer combination of group (d) are weakly acid ion exchange material per se if carboxylic acid groups are present. The salts, esters, amides, nitriles or anhydrides derived from such carboxylic acid groups, if present in the fluoropolymer combinations, are converted into the corresponding acids by known chemical methods of neutralization, saponification or hydrolysis. The resulting polymers are then weakly acidic ion exchange material.

Before or after conversion into ion exchange material of any type, the fluoropolymer combinations of this invention may be powdered, molded, shaved, cast, calendered or extruded into any desired physical form. The ion exchange material in the form of powder or pellets is useful for replacing cations or anions in solutions of inorganic salts with other cations or anions in accordance with standard commercial practice. They are particularly suited for demineralizing or otherwise treating hot solutions of caustic alkalis, strong acids and certain strong oxidizing agents because of their great chemical resistance to degradation.

In the form of membranes the ion exchange material of this invention is useful for electrodialysis operations, particularly with difficult solutions of the type just mentioned. These materials form particularly useful membranes for use in the electrode compartments of electrodialysis equipment in which aqueous sodium chloride is treated since they resist destruction by free chlorine and by hydroxide ions. Membranes can be produced from the ion exchange material of this invention which have low electrical resistance, high permselectivity, relatively high capacity and good mechanical properties and chemical stability.

This invention is more particularly described by the following examples. It is understood that the specific applications of the invention embodied in these examples are no way limiting, but are merely illustrative of the invention as defined above and in the claims.

Example 1

Poly(tetrafluoroethylene) film with a thickness of 0.25 mil was immersed in styrene monomer containing 0.01% by weight of benzoyl peroxide at 65–70° C. After 17.5 hours the film was found to contain 19.4% poly(styrene) which could not be extracted by boiling in benzene. Sulfonation of this film produced a cation exchange membrane with an electrical resistance of 2.9 ohm-cm.$^2$ after equilibration in 0.6 N KCl solution.

Example 2

The procedure of Example 1 was repeated except that the styrene (containing 0.01% of benzoyl peroxide by weight) was held at 90–95° C. for sixty minutes. The amount of poly(styrene) incorporated into the film was 10.9% by infrared analysis.

Chloromethylation of this film, followed by treatment with N-methylpiperidine for twelve hours at room temperature and washing with distilled water, produced anion exchange membrane with an electrical resistance of 8.1 ohm-cm.$^2$ after equilibration in 0.6 N KCl solution.

Example 3

The procedure of Example 1 was repeated except that the film of shaved poly(tetrafluoroethylene) had a thickness of 2.5 mils. After immersion in styrene (containing 0.01% benzoyl peroxide by weight) for 17.5 hours the amount of poly(styrene) incorporated into the film was only 3.2% by infrared analysis. This experiment again illustrates the advantage of employing thin films of the fluoropolymer starting material.

Example 4

It is possible to prepare the fluoropolymer combinations of this invention by heat alone without any chemical treatment. As an illustration, poly(tetrafluoroethylene) film with a thickness of 0.25 mil was immersed in pure styrene for varying lengths of time and at two different temperature ranges. The amount of poly(styrene) incorporated into the film was determined by infrared analysis in each case. The results are tabulated below.

| Reaction Temperature, ° C. | Immersion Time, Hours | Poly(styrene) Content, Weight Percent |
|---|---|---|
| 65–70 | 17.5 | 13.2 |
| 65–70 | 23.5 | 16.6 |
| 90–95 | 2 | 5.5 |
| 90–95 | 5 | 11.0 |

The film containing 16.6% poly(styrene) was immersed in chlorosulfonic acid for thirty minutes at 40–45° C., washed with carbon tetrachloride followed by water and hydrolyzed with 20% sodium hydroxide solution at 50° C. The resulting cation exchange membrane had an electrical resistance of 1.4 ohm-cm.$^2$.

Example 5

Into a 600 ml. beaker were placed 100 ml. of an aqueous emulsion of poly(tetrafluoroethylene), 100 ml. of water and 100 ml. of styrene containing 1.0% by weight of benzoyl peroxide. This mixture was stirred and maintained at 65° C. for five hours. Coagulation began after 105 minutes and continued until the end of the five hour period. The product was extracted with toluene, filtered, and boiled in water for ninety minutes. It was then extracted several times with hot toluene to remove unreacted material and dried in vacuo to constant weight. The styrene was uniformly incorporated into the coagulum to the extent of 3.7%.

This amorphous material was pressed into a film at 200° with a Carver press and sulfonated with chlorosulfonic acid for twenty minutes at 50° C. After rinsing in ethylene dichloride, hydrolysis in 20% sodium hydroxide, washing with distilled water and equilibration in 0.6 N KCl solution, the electrical resistance of the membrane was 21 ohm-cm.$^2$.

Example 6

A sample of 25 grams of powdered poly(chlorotrifluoroethylene) was heated in a muffle furnace set at 400° C. for five minutes. At the end of this period the material had become rather plastic but had not yet melted. It was dropped into excess 2-vinylpyridine monomer which had been preheated to 65° C., and the suspension was permitted to remain at this temperature for sixteen hours. At the end of this period the solid polymer was filtered off, extracted with hot toluene, again filtered, washed with ether, dried in vacuo and weighed. The weight gain was 8.3%, corresponding to the amount of 2-vinylpyridine incorporated into the fluoropolymer.

This powder was soaked in dilute hydrochloric acid and dried in an oven and compressd into a membrane with a thickness of 6 mils in a Carver press at a temperature of 150° C. The membrane was washed in distilled water and equilibrated in a 0.6 normal potassium chloride solution. It had an electrical resistance of 3.3 ohm-cm.$^2$ and a permselectivity of 73% measured between solutions of 0.5 and 1.0 normal KCl.

Example 7

A sample of powdered poly(chlorotrifluoroethylene) was immersed in 2-vinyl-5-ethylpyridine monomer containing 0.1% benzoyl peroxide by weight. The stirred suspension was heated at 100° C. for eight hours and filtered to remove the solid polymer. The latter was triturated with toluene, filtered, washed with ether and dried in vacuo to constant weight. The weight gain corresponded to 11.4% of 2-vinyl-5-ethylpyridine incorporated into the polymer.

The powdered polymer combination was suspended in trimethylene chlorobromide and heated at reflux temperature for two hours. It was then filtered off, washed with ether, vacuum dried and compressed into a membrane in the Carver press at a temperature of 170° C. The membrane was washed in distilled water, equilibrated in 0.6 normal KCl solution and had an electrical resistance of 1.3 ohm-cm.$^2$. The permselectivity between solutions of 0.5 and 1.0 normal KCl was 81%. The film thickness was 3.5 mils.

Example 8

Equal volume of an aqueous emulsion containing 52% of a copolymer of poly(chlorotrifluoroethylene) and poly(vinylidene chloride), de-inhibited styrene monomer and distilled water containing 0.2% potassium persulfate were thoroughly blended by shaking in a Pyrex tube. The tube was stoppered and heated for six hours in a water bath at 80° C., during which time a partial coagulation of the reaction mixture occured. The reaction mixture was then completely coagulated by high speed agitation in a blender and the coagulate extracted several times with hot toluene and hot water. It was finally filtered and dried in vacuo to constant weight. The resultant material contained 7.9% of poly(styrene) uniformly incorporated with the fluoropolymer.

This material was stretched into a membrane at 150° C. under a pressure of 3,500 p.s.i. with a Carver press, sulfonated with chlorosulfonic acid at 70° C. for one hour and worked up as described in Example 5. The electrical resistance of this 4 mil thick membrane was 4.5 ohm-cm.² after equilibration in 0.6 N KCl solution.

What is claimed is:

1. In a method of making ion conductive material in which a liquid vinyl monomer is polymerized in the presence of a polymer and a free radical generating catalyst, the step of introducing said liquid vinyl monomer into a solid polymer matrix of perhalogenated fluorocarbon material prior to polymerization and thereafter providing ion exchange groups in the product.

2. A method according to claim 1 wherein particles of fluoropolymer are penetrated by a liquid monomer which is polymerized therein, said particles are thereafter fused into a film and ion exchange groups are provided throughout said film from one surface thereof to the other.

3. The process for the production of ion conductive films and ion exchange membranes which comprises mixing styrene monomer with granules of a perhalogenated fluoropolymer so that the styrene penetrates throughout said polymer, polymerizing the said styrene monomer within the said granules, converting the resulting thermoplastic granules into a film by hot shaping under pressure and thereafter treating the resulting film with ion exchange group donor reagents under conditions such as to introduce ion exchange groups into the product.

4. A method according to claim 1 wherein the fluoropolymer is in the form of a film which imbibes the monomer.

5. The process for the production of ion exchange material which comprises imbibing a free radical generating catalyst and a vinyl monomer into a thermoplastic, linear polymer perhalogenated of a fluorine containing ethylenically unsaturated aliphatic hydrocarbon, polymerizing said monomer while adsorbed therein to form a resultant composite polymeric product, and thereafter reacting the said resultant composite polymeric product with a reagent which causes ion exchanging groups to be substituted on the said resultant composite polymeric product.

References Cited by the Examiner

UNITED STATES PATENTS 2,827,426   3/1958   Bodamer _____ 204—98

FOREIGN PATENTS 563,237   6/1958   Belgium.
72,416   11/1959   France.

OTHER REFERENCES

Behr et al.: J. Polymer Science, vol. 19, pages 219–224, January 1956, Library Call No. QD 281 P6J6.

Brookhaven National Laboratory (BNL 375), pp. 26, April 1956; Quarterly Progress Report, Oct. 1–Dec. 31, 1955.

Brookhaven National Laboratory (BNL 414), pp. 1–11, October 1956 (Fission Products Utilization IX).

Chen et al.: J. Polymer Science, vol. 23, pp. 903–913, January 1957, Libr. Call No. QD 281 P6J6.

WILLIAM H. SHORT, *Primary Examiner.*
JOHN C. MARTIN, *Assistant Examiner.*